(12) United States Patent
Denk, Jr.

(10) Patent No.: US 9,129,342 B2
(45) Date of Patent: Sep. 8, 2015

(54) METHOD AND SYSTEM FOR FACILITATING ELECTRONIC COMMUNICATION BETWEEN THE PUBLIC AND A PUBLIC PERSONALITY OR REPRESENTATIVE

(76) Inventor: William E. Denk, Jr., Hanover, PA (US)

(*) Notice: Subject to any disclaimer, the term of this patent is extended or adjusted under 35 U.S.C. 154(b) by 923 days.

(21) Appl. No.: 12/334,938

(22) Filed: Dec. 15, 2008

(65) Prior Publication Data

US 2009/0186702 A1 Jul. 23, 2009

Related U.S. Application Data

(60) Provisional application No. 61/013,715, filed on Dec. 14, 2007.

(51) Int. Cl.
*G06F 17/00* (2006.01)
*G06Q 90/00* (2006.01)

(52) U.S. Cl.
CPC ........................................ *G06Q 90/00* (2013.01)

(58) Field of Classification Search
CPC ........................................................ G06Q 90/00
USPC ........................................................ 463/42, 43
See application file for complete search history.

(56) References Cited

U.S. PATENT DOCUMENTS

| | | | | |
|---|---|---|---|---|
| 5,533,124 A | * | 7/1996 | Smith et al. | 705/57 |
| 5,675,746 A | * | 10/1997 | Marshall | 705/35 |
| 5,732,229 A | * | 3/1998 | Dickinson | 715/764 |
| 5,743,801 A | * | 4/1998 | Welander | 463/44 |
| 5,788,283 A | * | 8/1998 | Adler | 281/38 |
| 5,846,132 A | * | 12/1998 | Junkin | 463/42 |
| 6,497,410 B1 | * | 12/2002 | Bernstein et al. | 273/297 |
| 6,688,973 B2 | * | 2/2004 | Satloff et al. | 463/1 |
| 6,773,351 B2 | * | 8/2004 | Brown | 463/43 |
| 6,848,078 B1 | * | 1/2005 | Birsan et al. | 715/206 |
| 6,956,591 B2 | * | 10/2005 | Lundin et al. | 345/684 |
| 7,120,668 B2 | * | 10/2006 | Manber et al. | 709/205 |
| 7,124,125 B2 | * | 10/2006 | Cook et al. | 1/1 |
| 7,207,476 B1 | * | 4/2007 | Slate | 235/375 |
| 7,435,171 B2 | * | 10/2008 | Hanafusa | 463/11 |
| 7,467,356 B2 | * | 12/2008 | Gettman et al. | 715/850 |
| 7,584,123 B1 | * | 9/2009 | Karonis et al. | 705/26.3 |
| 7,610,607 B1 | * | 10/2009 | Kiraly | 725/119 |
| 7,797,168 B2 | * | 9/2010 | Kusumoto et al. | 705/1.1 |
| 7,992,106 B2 | * | 8/2011 | Nelson | 715/854 |
| 2001/0008852 A1 | * | 7/2001 | Izumi | 463/42 |
| 2002/0040929 A1 | * | 4/2002 | Bramucci | 235/435 |
| 2002/0065580 A1 | * | 5/2002 | Derakhshan | 700/245 |
| 2002/0099607 A1 | * | 7/2002 | Sosa et al. | 705/14 |
| 2002/0156715 A1 | * | 10/2002 | Wall et al. | 705/37 |
| 2003/0069874 A1 | * | 4/2003 | Hertzog et al. | 707/1 |
| 2003/0188465 A1 | * | 10/2003 | Ruiz | 40/124.01 |
| 2003/0221159 A1 | * | 11/2003 | Kaprosy | 715/500 |
| 2004/0002387 A1 | * | 1/2004 | Grady | 463/43 |
| 2004/0122816 A1 | * | 6/2004 | Kirkland et al. | 707/5 |

(Continued)

*Primary Examiner* — Mohammad Islam
*Assistant Examiner* — John P Dulka
(74) *Attorney, Agent, or Firm* — Barnes & Thornburg LLP; Thomas J. McWilliams; Edward F. Behm, Jr.

(57) ABSTRACT

The invention is concerned with a virtual trading card system, comprising a data source that provides information associated with a public figure, and a user device configured to display a first and a second virtual view of an electronic card associated with the public figure, wherein the second virtual view includes a plurality of updateable data fields.

24 Claims, 12 Drawing Sheets

(56) References Cited

U.S. PATENT DOCUMENTS

| | | | |
|---|---|---|---|
| 2004/0244060 A1* | 12/2004 | Glassman et al. | 725/140 |
| 2005/0182693 A1* | 8/2005 | Alivandi | 705/27 |
| 2005/0255913 A1* | 11/2005 | Cok | 463/31 |
| 2006/0036548 A1* | 2/2006 | Roever et al. | 705/51 |
| 2006/0095976 A1* | 5/2006 | Torres et al. | 726/28 |
| 2006/0136315 A1* | 6/2006 | Muthiki et al. | 705/35 |
| 2006/0173761 A1* | 8/2006 | Costakis | 705/35 |
| 2006/0173764 A1* | 8/2006 | Costakis et al. | 705/35 |
| 2007/0157252 A1* | 7/2007 | Perez | 725/61 |
| 2007/0186164 A1* | 8/2007 | Getsch | 715/723 |
| 2007/0186230 A1* | 8/2007 | Foroutan | 725/24 |
| 2008/0104103 A1* | 5/2008 | Adams | 707/102 |
| 2008/0183678 A1* | 7/2008 | Weston et al. | 707/3 |
| 2008/0227512 A1* | 9/2008 | Lang | 463/11 |
| 2008/0301154 A1* | 12/2008 | Vithayathil | 707/100 |
| 2009/0063099 A1* | 3/2009 | Counts et al. | 702/188 |
| 2009/0121436 A1* | 5/2009 | Perkins | 273/298 |
| 2009/0149248 A1* | 6/2009 | Busey et al. | 463/29 |
| 2010/0255908 A1* | 10/2010 | Grimes | 463/31 |

\* cited by examiner

METHOD AND SYSTEM FOR FACILITATING ELECTRONIC COMMUNICATION BETWEEN THE PUBLIC AND A PUBLIC PERSONALITY OR REPRESENTATIVE

CROSS REFERENCE TO PRIOR APPLICATIONS

This application claims priority and the benefit thereof from U.S. Provisional Application No. 61/013,715, filed on Dec. 14, 2007, which is hereby incorporated by reference for all purposes as if fully set forth herein.

FIELD OF THE INVENTION

The invention generally relates to a method, a system and a computer program for facilitating electronic communication between the public and a public personality or representative. More particularly, the invention relates to a virtual trading card system, method and computer program to facilitate connection and/or electronic communication between the public and a public personality or representative.

BACKGROUND OF THE INVENTION

Individuals frequently desire to connect with public personalities or representatives (i.e., public figures), such as, for example, but not limited to, professional athletes, actors, musicians, business leaders, professionals, product/service providers/politicians, and the like. This may be done through paper media (such as, e.g., newsletters, journals, advertisements, magazines, tabloids, newspapers, trading cards, or the like) or electronic media (such as, e.g., radio, television, the Internet, or the like). However, regardless of whether it is a paper or electronic media, information associated with a particular public figure may be difficult, if not practically impossible to find, especially with public figures who retired a long time ago.

For years, a physical connection with a public figure has been accomplished through paper media such as, for example, trading cards. A trading card (or collectible card) is typically a small card that is intended for trading or collecting. Trading cards are generally associated with sports—baseball cards are especially well known. Cards dealing with other subjects are often considered a separate category from sports cards, known as non-sports trading cards. These often feature cartoon characters, comic book characters, Hollywood actors, television series excerpts, movie stills, or the like.

As with playing cards, which they generally resemble, trading cards are often used to play various games. For example, in the 1990s, trading cards designed specifically for playing games became popular enough to develop a distinct category of collectible card games. These trading cards tend to use either fantasy subjects or sports as a basis for gameplay.

Trading cards, however, suffer from a number of drawbacks, including, for example, wear, damage, loss, cost, or the like. Thus, many individuals purchase trading cards and, because they are fearful of damaging or losing them, safely store the cards, forgoing full enjoyment of the cards. Individuals may keep these cards for indefinite periods of time because they can be great reminders of special moments in time.

Another drawback of paper trading cards is that the information on the cards does not change. For instance, once an individual has a sports trading card for a particular season, the individual must purchase another card for another following (or preceding) season, since a player's statistics may change in each season.

While it may be possible to find information associated with a particular past public figure on the Internet, the information may be scattered across multiple websites. Still, many individuals desire to relive certain experiences, or even to share some of those experiences with others. For instance, many sports fans speak of their love for a particular game (such as, e.g., golf, baseball, basketball, football, soccer, hockey, tennis, swimming, and the like) and how a particular player or team may have affected their lives. These individuals may desire to share stories of their experiences with others by, for example, retelling an experience they may have witnessed first-hand (e.g., Namath calling the game against the Colts), or meeting a great player (e.g., Mean Joe Green).

Historically, for many individuals, connections (or re-connection) with public figures have been limited to, e.g., memory, watching an occasional vintage game, buying a DVD about a game or team, reading a book, revisiting trading cards they may have kept since childhood (or purchased recently), attending an event where the public figure may appear, or the like. While the Internet has provided individuals with an ability to get closer than ever before to public figures, information, products and/or services associated with the public figures can be illusive.

A large amount of the information available on the Internet includes content that has been uploaded by individuals who have bypassed traditional review, classification or screening. The content is frequently uploaded sporadically without any approval or authorization by the owner of the intellectual property for the content. Thus, royalties and income may be lost that should go directly to benefit the creators of the content.

Furthermore, finding and/or purchasing products and/or services associated with public figures may be problematic. Information about the products and/or services may be sporadically located across a plethora of media (such as, for example, without limitation, books, magazines, journals, newspapers, newsletters, advertisements, television programs, radio programs, Internet websites, and the like) that may be virtually impossible to effectively navigate.

SUMMARY OF THE INVENTION

According to an aspect of the invention, a virtual trading card system is provided that comprises a data source that provides information associated with a public figure; and a user device configured to display a first and a second virtual view of an electronic card associated with the public figure, wherein the second virtual view includes a plurality of updateable data fields.

According to another aspect of the invention, a virtual trading card method is provided that comprises displaying a main page that includes one or more selectable links, and displaying one of an all cards subcategory, a search subcategory or a my cards subcategory in response to a selection of the one or more selectable links.

According to another aspect of the invention, a computer readable medium is provided that includes a computer program, comprising main page display instructions, which when executed, cause displaying a main page that includes one or more selectable links, and subcategory display instructions, which when executed, cause displaying one of an all cards subcategory, a search subcategory or a my cards subcategory in response to a selection of the one or more selectable links.

Additional features, advantages, and embodiments of the invention may be set forth or apparent from consideration of the detailed description and drawings. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE INVENTION

Figure 1:
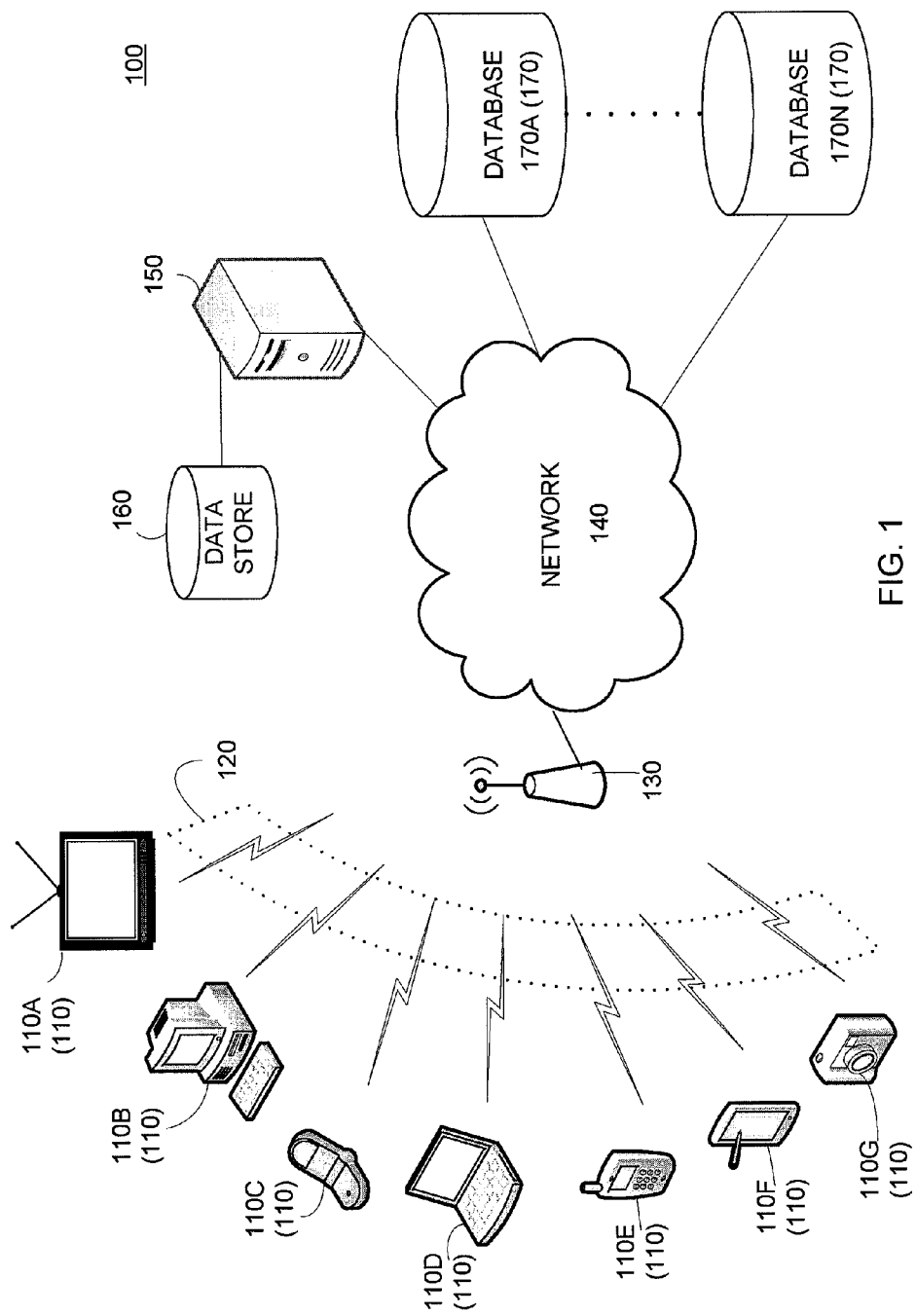
FIG. 1 shows an example of a virtual trading card system, according to an embodiment of the invention.

The embodiments of the invention and the various features and advantageous details thereof are explained more fully with reference to the non-limiting embodiments and examples that are described and/or illustrated in the accompanying drawings and detailed in the following attached description. It should be noted that the features illustrated in the drawings are not necessarily drawn to scale, and features of one embodiment may be employed with other embodiments as the skilled artisan would recognize, even if not explicitly stated herein. Descriptions of well-known components and operating techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention. Moreover, it is noted that like reference numerals represent similar parts throughout the several views of the drawings.

FIG. 1 shows a non-limiting example of a virtual trading card (VTC) system 100, according to an embodiment of the invention. The VTC system 100 includes one or more user interface devices (UIDs) 110 (such as, e.g., a television set 110A, a personal computer 110B, a mobile phone 110C, a laptop or notebook computer 110D, a smart phone 110E, a personal data assistant (PDA) 110F, an image pickup device 110G, a software-defined-radio (SDR) (not shown), a two-way radio (not shown), a game console (not shown), a game controller (not shown), a gaming device (not shown) and the like), one or more communication links 120, a communication access point 130, a network 140, a server 150, a data store 160, and one or more databases 170 (such as, e.g., 170A, ..., 170N, where N is a positive integer greater than one). The one or more UIDs 110 may be coupled to each other or to the network 140 through the communication links 120 and the access point 130. The server 150 and the one or more databases 170 may also be coupled to the network 140. The server 150 may also be coupled to the data store 160.

The various communication links (or connections), including the communication links 120, between the UID(s) 110, access point 130, network 140, server 150, data store 160 and database(s) 170 may include wired or wireless communication media, or any combination of wired or wireless communication media, as is known in the relevant art. The wireless communication links may include, for example, at least one of an IEEE 802.11 standard-compliant link, a DECT standard-compliant link, an 0G, 1G, 2G, 3 G or 4G cellular standard-compliant link, a Bluetooth compliant link, or the like.

The one or more UIDs 110 may be provided at a same or a different location. Further, the server 150 and the data store 160 may be provided at a same or a different location. Similarly, the one or more databases 170 may be provided at a same or a different location. Moreover, the one or more databases 170 may be provided at the same or different location as the server 150 and/or the data store 160.

A location may include a physical location, such as, but not limited to, for example, a residence, a school, a workplace, a restaurant, a coffee shop, an airport, a bus terminal, a train station, or any other private or public location, including a provider location, or any combination of the preceding as will be readily appreciated by those skilled in the art, without departing from the scope or spirit of the invention. Additionally, the user location may include a virtual location, such as, but not limited to, for example, an access point address, a network address, a website address, a telephone number, an email address, a television channel, a television satellite channel, a radio channel, a radio satellite channel, or the like.

It is noted that each of the components 110, 130, 140, 150, 160 or 170 of the VTC system 100 may include a machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a personal computer, a laptop computer, a palmtop computer, a notebook computer, a desktop computer, a workstation computer, a server, or the like, or an array of processors, microprocessors, central processing units, general purpose computers, personal computers, laptop computers, palmtop computers, notebook computers, desktop computers, workstation computers, servers, or the like.

The access point 130 may include, for example, but is not limited to, a machine, a device, a circuit, a component, or a module, or any system of machines, devices, circuits, components, modules, or the like, which are capable of functioning as a gateway for the one or more UIDs 110 to access the network 140. The access point 130 may include a hot spot such as, for example, a common public application of wireless access points, where the UIDs 110 can connect to each other or to the network 140 through the communication links 120.

The network 140 may include, but is not limited to, for example, any one or more of a personal area network (PAN), a local area network (LAN), a campus area network (CAN), a metropolitan area network (MAN), a wide area network (WAN), a broadband network (BBN), the Internet, or the like. Further, the network 140 may include, but is not limited to, for example, any one or more of the following network topologies, including a bus network, a star network, a ring network, a mesh network, a star-bus network, tree or hierarchical network, or the like.

The server 150 may include, but is not limited to, for example, any combination of software or hardware, including at least one application and/or at least one computer to perform services for connected clients as part of a client-server architecture. The at least one server application may include, but is not limited to, for example, an application program that can accept connections to service requests from clients by sending back responses to the clients. The server 150 may be configured to run the at least one application, often under heavy workloads, unattended, for extended periods of time with minimal or no human direction. The server 150 may include a plurality of computers configured, with the at least one application being divided among the computers depending upon the workload. For example, under light loading, the at least one application can run on a single computer. However, under heavy loading, multiple computers may be required to run the at least one application. The server 150, or any if its computers, may also be used as a workstation.

The data store 160 and the one or more database(s) 170 may include, for example, any combination of software or hardware configured to receive, organize, store, manage, or process data according to a database model, such as, for example but not limited to, a relational model, a hierarchical model, a network model, a post-relational model, an object model, or the like. The database(s) 170 may further include a database management system (DBMS) to organize, store and manage the received data, as well as manage performance, concurrency, integrity, recovery from hardware failures, or the like.

It is noted that the information retrieved from various data sources for a particular public figure may be populated in a file or record in the database(s) 170, stored in the data store 160, stored in the server 150, or stored in the UID 110. The information may be automatically forwarded to a particular UID 110 from the server 150 over the network 140 according to, for example, a predetermined schedule, in response to an instruction (e.g., a request, a search, or the like) from the UID 110, according to a user profile stored in the server 150, or the like.

In an embodiment of the invention, a virtual trading card may be created in the server 150 and made available to an individual through an UID 110. The trading card may include electronic watermarking, copy prevention, or the like, as is known by those skilled in the art, to prevent unauthorized copying of the card. The trading card may be communicated from the server 150 to the UID 110 over the network 140 and loaded into the UID 110. The trading card may be communicated from one UID 110 to another UID 110 such as, for example, when two or more individuals trade virtual trading cards.

The virtual trading card (or electronic trading card) may be created as a subset of a larger group of similarly classified (categorized) cards, such as, for example, but not limited to, a baseball trading card of a particular baseball player that is created in addition to other virtual trading cards that are created for other baseball players belonging to the same (or different) team, game, season, or the like. Virtual trading cards may be similarly created and classified for other public figures. The trading cards may be grouped together to create a cohesive offering and consistency, similar to a physical deck of trading cards.

Figure 2B:
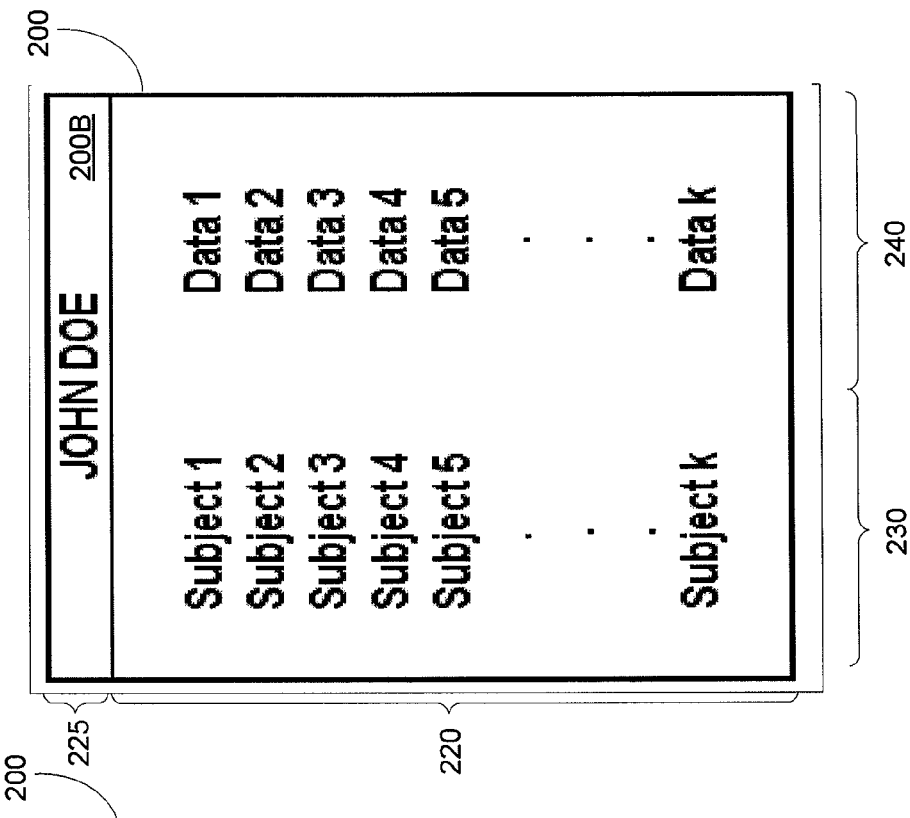
FIGS. 2A and 2B show respective examples of a virtual front view and a virtual back view of an example of a virtual trading card, according to an embodiment of the invention.
Figure 2A:
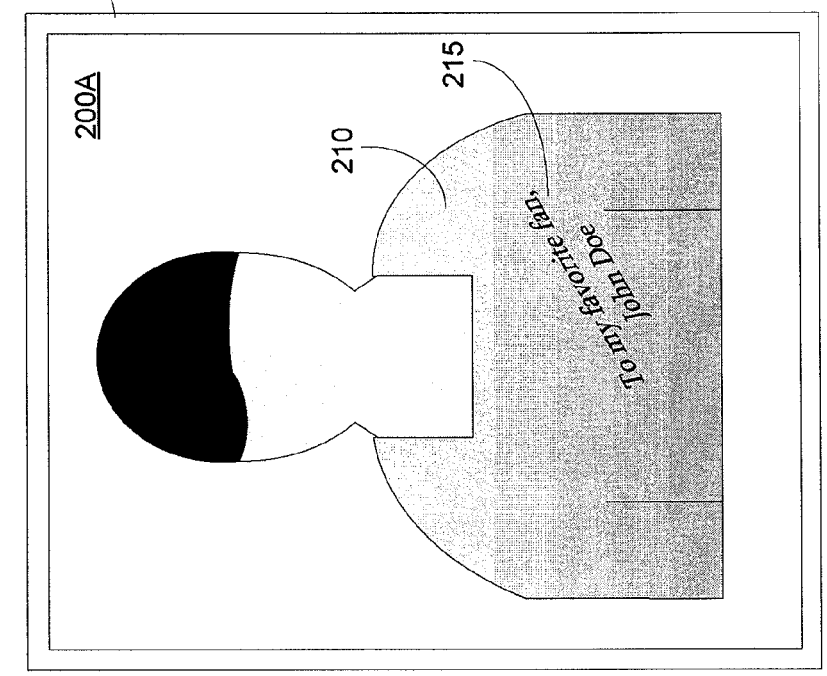

FIGS. 2A and 2B show respective examples of a virtual front view 200A and a virtual back view 200B of an example of a virtual trading card (or electronic trading card) 200, according to an embodiment of the invention. The virtual front (200A) and back (200B) views may be displayed on, for example, a display included in one or more of the UID(s) 110 shown in FIG. 1. For example, the views 200A, 200B may be displayed on the display of a smart phone 110E, such as, for example, but not limited to, an Apple iPhone™, a RIM BlackBerry Storm™, a RIM BlackBerry Bold™, a Palm Treo™, or the like. The UID 110 may include special effects transitioning to simulate page turning between the front view 200A and the back view 200B of the virtual trading card 200. Additionally, the UID 110 may include special effects transitioning to transition between the front 200A and back 200B views of the virtual card 200, such as, for example, but not limited to, fading, dissolving, wiping, blending, mosaicing, or the like, as is known in the art.

It is noted that the virtual trading card 200 is in no way limited to the front and back views 200A, 200B shown in FIGS. 2A, 2B, respectively. Rather, the trading card 200 may include any number of views, including one, two, three, four, etc., as the skilled artisan will readily recognize, without departing from the scope or spirit of the invention.

The virtual trading card 200 may be grouped together with other similar (or different) virtual trading cards to create a cohesive offering and consistency, as discussed below. The virtual trading card may include audio, video and/or animation.

Referring to FIG. 2A, the virtual front view 200A may include, for example, but is not limited to a still image, a moving image, alphanumeric characters, or any combination thereof. For example, an image 210 may include a professional or personal photograph of a public figure. Additionally, the image 210 may include a moving image (such as, e.g., a video excerpt from a public or private event, including, but not limited to, a theatrical performance, a music video, a movie, a concert, a game, a home video, a school presentation, or the like). The image 210 may further include a signature field 215 of the public figure, which may have been hand-signed by the public figure by, for example, using a stylus and UID 110F. That is, the individual may allow the public figure (e.g., John Doe) to directly sign a virtual trading card on the individual's UID 110F using, for example, a stylus, a pen, a pencil, a finger, or the like. Additionally, the signature may be transferred to the UID 110F of the individual from another UID 110 (e.g., a public figure may use her/his own UID 110 to transfer a signature to one or more UIDs 110F).

Referring to FIG. 2B, the virtual back view 200B may include a display array 220. While the display array 220 may include a k×m array of cells, the following description includes a k×2 array of cells, including subject fields 230 and data fields 240, for the sake of simplicity, where k and m are non-zero positive integers. The array 220 may include, for example, but is not limited to, one or more of the following: a biography (such as, e.g., past and/or present information, a resume, a curriculum vitae (cv), or the like); past performance information (such as, e.g., game statistics, career performance statistics, representative work, success stories, projects, or the like); interests information (such as, e.g., hobbies, charities, or the like); products/services information (such as, e.g., memorabilia, products endorsed or offered by the public figure, services endorsed or offered by the public figure, auctions for charity, auctions for needs of the public figure, or the like); events/appearances information (such as, e.g., scheduled events or appearances by the public figure, frequented events by the public figure, or the like).

In the instance of sports, for example, the public figure may be an active player, a retired player, a famous player or a little-known player. The virtual trading card may include a still image 200A of the player (or a moving image such as a video highlight excerpted from a famous game played by the player). The virtual back view 200B may include the array 220, which may include, for example, the player's first and last name 225, a particular game/season/career of the player (not shown), subject fields 230 (e.g., subject 1, subject 2, . . . , subject k) and data fields 240 (e.g., data 1, data 2, . . . , data k). The subject fields 230 may include subjects associated with a particular game, a particular season, or the career of the player, such as in baseball, for example, Batting Average, On Base Percentage, Number of Singles, Number of Doubles, Number of Triples, Number of Home Runs, Number of Steals, Number of RBIs, Number of Runs, Pitching ERA, E Runs, Slugging Percentage, Plate App., Number of Strikeouts, Number of Walks, Number of Hit-by-Pitch, Number of On by Error, Number of Sacrifices, Number of Bunt Sacrifices, Number of Fielder Ch., Number of Innings, or the like, without limitation. The data fields 240 may include the values for the particular player and the particular game/season/career that are associated with, for example, but limited to, the Batting Average, the On Base Percentage, the Number of Singles, the Number of Doubles, the Number of Triples, the Number of Home Runs, the Number of Steals, the Number of RBIs, the Number of Runs, the Pitching ERA, the E Runs, the Slugging Percentage, the Plate App., the Number of Strikeouts, the Number of Walks, the Number of Hit-by-Pitch, the Number of On by Error, the Number of Sacrifices, the Number of Bunt Sacrifices, the Number of Fielder Ch., the Number of Innings, or the like.

The subject fields 230 may be automatically selected (e.g., pre-selection at an OEM, pre-selection on the UID 110 by the user, an instruction from the server 150, or the like) or manually selected in the UID 110 by, for example, entering data, using a drop-down menu, or the like. The data fields 240 may be preloaded into the UID 110 (shown in FIG. 1), input into the UID 110, or received by the UID 110 through the communication links 120. The data fields 240 may be updated in real-time to keep the data current, or the data fields 240 may be updated according to a predetermined schedule entered in the UID 110 or the server 150.

Furthermore, links may be uploaded to the UID 110 from the public figure or a third party, including a member of the public. The links may include, for example, message links (e.g., blogs, messages, or the like), multimedia links (e.g., website addresses, photos, movies, videos, sound bites, songs, speeches, or the like), merchandising links (e.g., a website address, a telephone number, a physical address, GPS coordinates, a business name, or the like, to enable the individual to purchase memorabilia directly from a producer of the virtual trading card, or an entity authorized to sell the memorabilia, or the individual to communicate with the entity represented on the card, or their representative, or the like).

Figure 3:
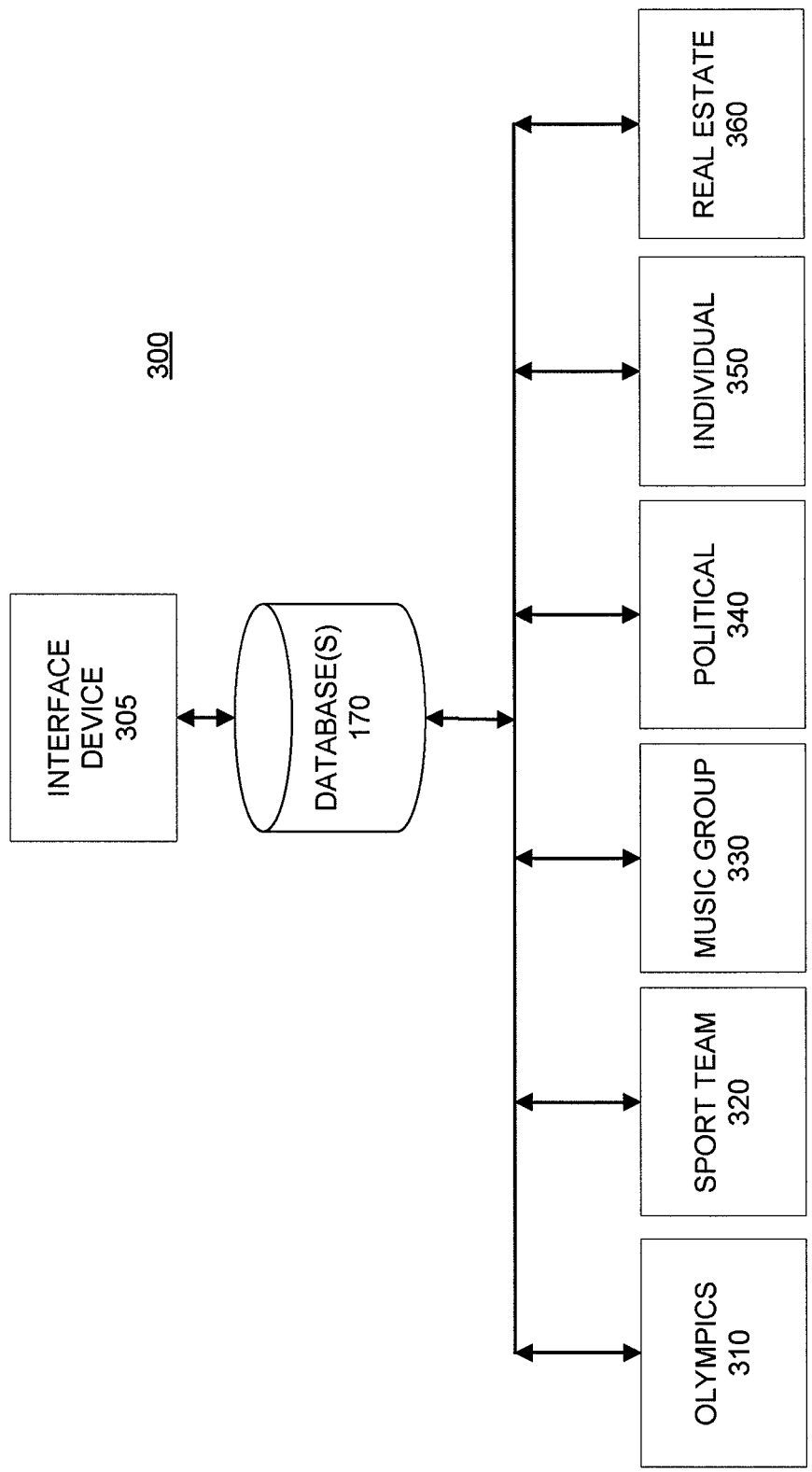
FIG. 3 shows an example of a multi-media connection flow diagram, according to an embodiment of the invention.

FIG. 3 shows an example of a multi-media connection system 300 flow diagram, according to an embodiment of the invention. The system 300 may include an interface device 305, the one or more database(s) 170, an Olympics data source 310, a sport team data source 320, a music group data source 330, a political party data source 340, an individual data source 350, a real estate data source 360, and the like. The interface device 305 may include a machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a personal computer, a laptop computer, a palmtop computer, a notebook computer, a desktop computer, a workstation computer, a server, or the like, or an array of processors, microprocessors, central processing units, general purpose computers, personal computers, laptop computers, palmtop computers, notebook computers, desktop computers, workstation computers, servers, or the like. Further, the interface device 305 may include the IUD 110 or the server 150, both shown in FIG. 1.

The data sources 310 to 360 may include electronic multimedia or physical media, such as, for example, but not limited to, newsletters, newspapers, journals, magazines, books, photographs, movies, advertisements, video clips, video files, sound bites, sound files, input by voice command or the like. In the case of physical media, the source material may be converted to electronic form by, for example, scanning the source material using optical character recognition (OCR), or the like. Information that is associated with a particular public figure may be sent to the database(s) 170 from any one or more of the data sources 310, 320, 330, 340, 350, or 360, as the information becomes available. Additionally, the database(s) 170 may include one or more search engines that search the data sources 310, 320, 330, 340, 350, or 360 for information associated with the public figure. The database(s) 170 may be populated with the data found in the searches. For example, the found data may be associated with the public figure and stored as records associated with a file or record dedicated to the particular public figure. Information may be retrieved, sorted and stored in association with public figures who may be, for example, athletes, musicians, singers, song writers, actors, politicians, professionals, realtors, individuals, or the like, without limitation.

Figure 4:
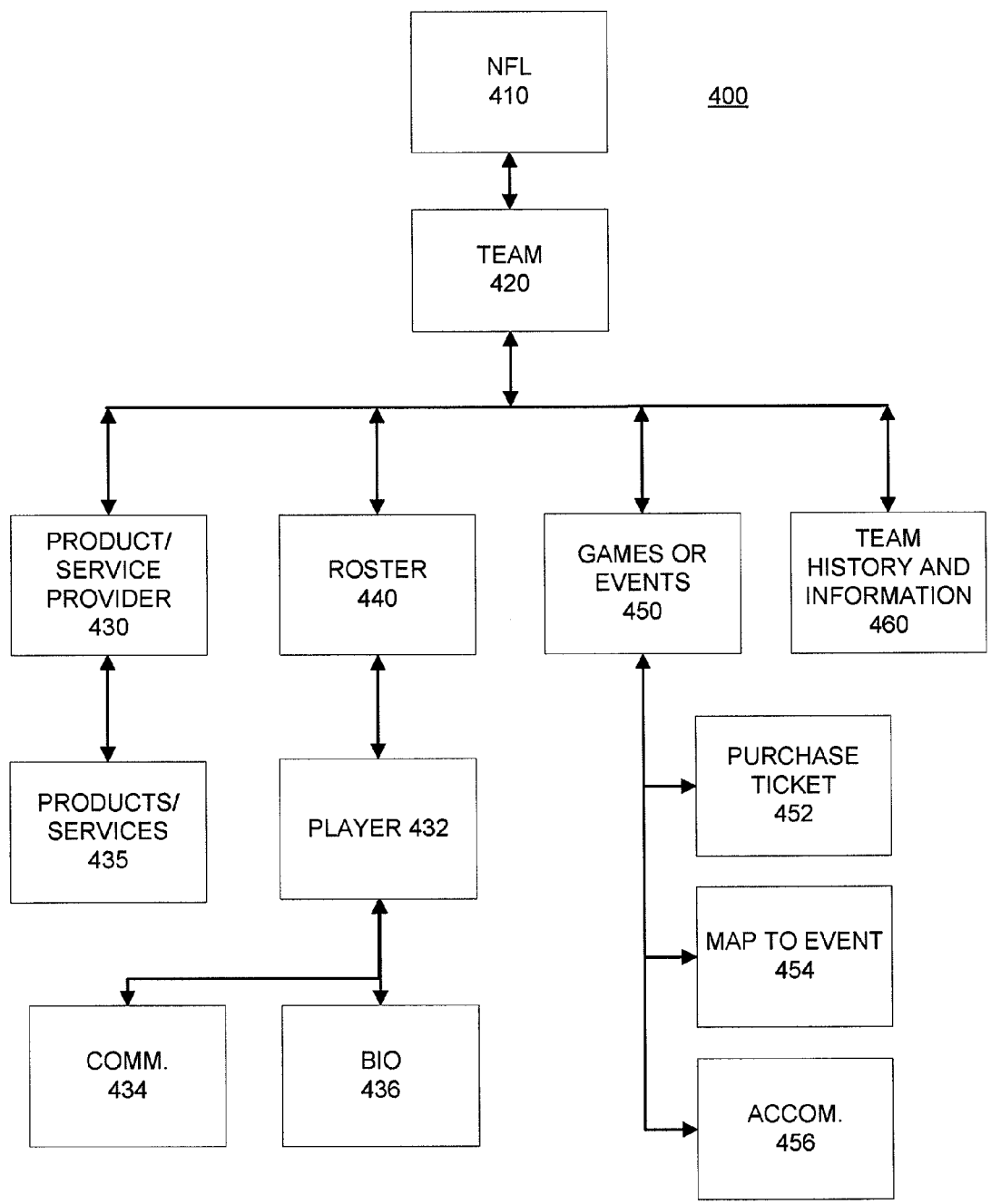
FIG. 4 shows an example of a sports league flow diagram, according to an aspect of the invention.

FIG. 4 shows an example of a sports league flow diagram 400 that may be implemented in the UID 110 and/or the server 150 (shown in FIG. 1), according to an aspect of the invention. In FIG. 4, the sports league includes the National Football League (NFL) as an example.

Referring to FIG. 4, an individual (e.g., using the UID 110) may retrieve one or more virtual sports trading cards associated with, for example, the NFL. After opening or initializing a root NFL 410 category (or classification), the individual may proceed to various subcategories. For example, the individual may select a particular team 420 from a plurality of teams. The selection may be facilitated by displaying one or more selectable links (e.g., thumbnail images, alphanumeric links, or the like) on the display of the UID 110, which the individual may select by, for example, touching the screen of the UID 110 with a finger, a stylus, a cursor, or the like.

After the particular team 420 has been selected, the individual may access any one of four subcategories, including a product or service provider 430, a team roster 440, a games or events list 450 and a team history (or other information related to the team). In the exemplary flow diagram 400 shown in FIG. 4, the various categories and subcategories 410 to 460 may be traversed on the UID 110 in either direction, as shown by the bi-directional arrows, transitioning between the various categories or subcategories using special effects such as, for example, page-turning, wiping, fading, blending, mosaicing, or the like.

The product/service provider 430 may include, for example, a list or menu with one or more selectable links to respective entities that offer products or services related to the team 420 (such as, e.g., team memorabilia, etc.). After selecting a particular product/service provider 430, a list or menu with one or more selectable links to respective products/services 435 offered by the provider 430 may be displayed on the UID 110, from which the individual may then select to, for example, purchase a particular product or service (e.g., by selecting a "Buy Now" option, or the like).

The roster 440 may include, for example, a list or menu with one or more selectable links to respective players 432 on the team 420. After a virtual trading card is selected for a particular player 432, a communication subcategory 434 or a bio subcategory 436 may be selected. The communication subcategory 434 may include fields to receive entries (such as, e.g., notes, messages, photos, etc.) from the individual (via the UID 110) or to display messages (such as, e.g., notes, messages, photos, etc.) from the particular player 432 to the individual on her/his UID 110. The bio subcategory 436 may include biography information associated with the particular player 432.

The games or events 450 may include, for example, a list or menu with one or more selectable respective games and/or events associated with the particular team 420. After selection of a particular game or event 450, an individual may select from three subcategories, including a purchase ticket 452, a map-to-event 454, or an accommodations 456. The purchase ticket 452 may include, for example, a list or menu with one or more selectable links to a game or an event ticket for the particular game or event 450. The map-to-event 454 may include, for example, a display of a map from, for example, the physical location of the UID 110 to the particular game or event 450, including directions. The accommodations 456 may include, for example, a list or menu with one or more selectable accommodations providers, which may be selected to, for example, make reservations at a hotel near the game or event 450.

The team history and information 460 may include, for example, historical information regarding the team 420, as well as other information associated with the team 420.

Figure 5:
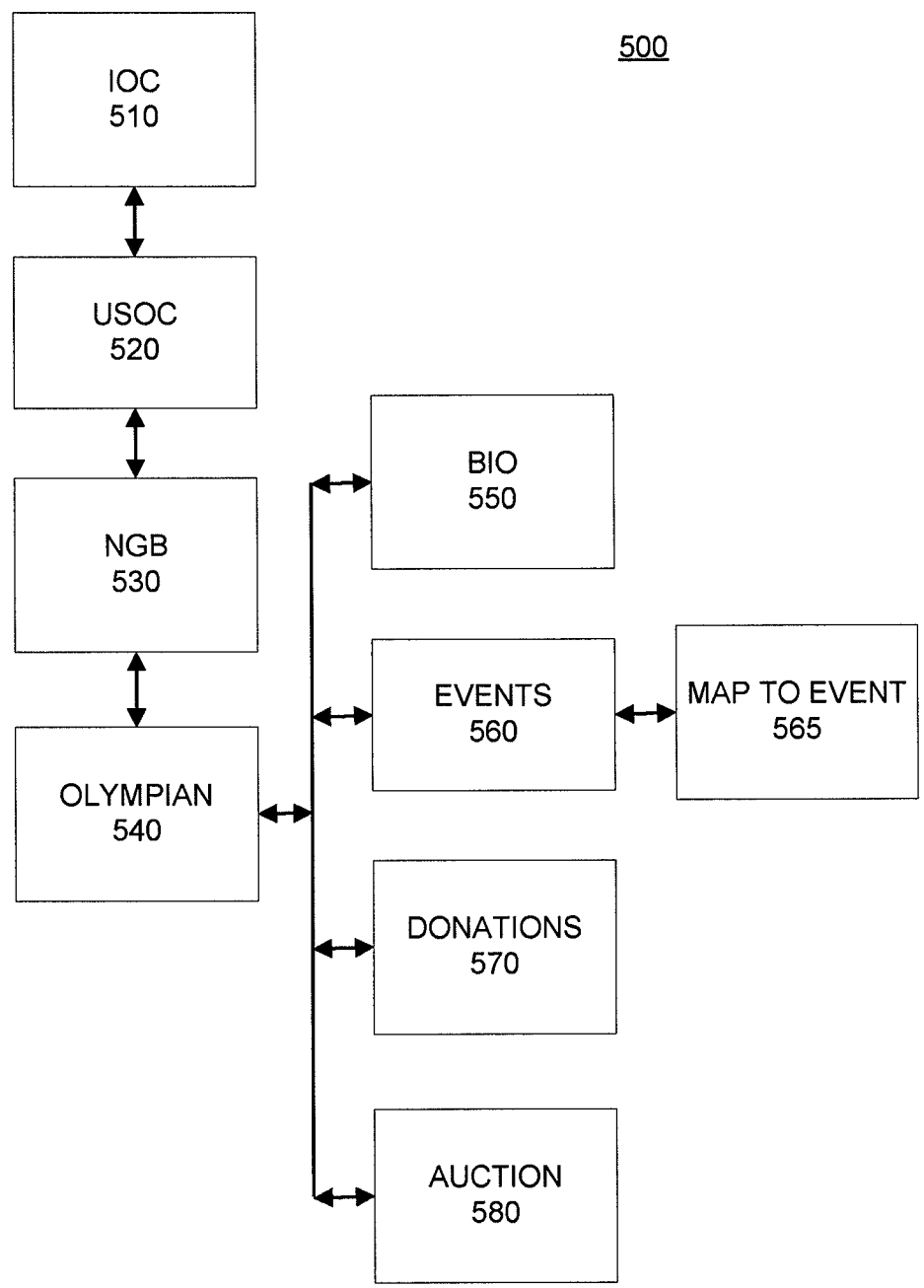
FIG. 5 shows an example of an Olympian games flow diagram, according to an aspect of the invention.

FIG. 5 shows an example of an Olympian games flow diagram 500 that may be implemented on the UID 110 and/or the server 150 (shown in FIG. 1), according to an aspect of the invention.

Referring to FIG. 5, an individual (e.g., using the UID 110) may retrieve one or more virtual trading cards associated with, for example, the Olympian games 510. After opening or initializing a root International Olympic Committee (IOC) 510 category (or classification), the individual may proceed to select, for example, the United States Olympic Committee (USOC) 520 from a plurality of national Olympic committees (not shown). Next, a national governing body (NGB) 530 may be selected from a plurality of national governing bodies associated with the USOC 520. After the particular NGB 530 has been selected, a particular Olympian 540 may be selected from one or more Olympians associated with the NGB 530. After the Olympian 540 has been selected, the individual may access any one of four subcategories associated with the NGB 530, including bio 550, events 560, donations 570, or auction 580. Should the events 560 subcategory be selected, a map-to-event 565 subcategory may be selected.

The bio 550 may include biography information associated with the particular Olympian 540. The games or events 560 may include, for example, a list or menu with one or more selectable respective games and/or events associated with the Olympian 540. After selection of a particular game or event 560, an individual may select the map-to-event 454, which may include a display of a map from, for example, the physical location of the UID 110 to the particular game or event 560, including directions.

The donations 570 may include, for example, a list or menu with one or more selectable donations, such as, for example, a donation to the Olympian 540, a donation to the Olympian's team, a charity associated with the Olympian 540, or the like.

The auctions 580 may include, for example, a list or menu with one or more selectable auctions associated with the Olympian 540, including, for example, an auction to raise money for the Olympian 540, an auction to raise money for the Olympian's team, an auction of memorabilia of the Olympian 540, an auction of Olympic memorabilia, or the like.

Figure 6:
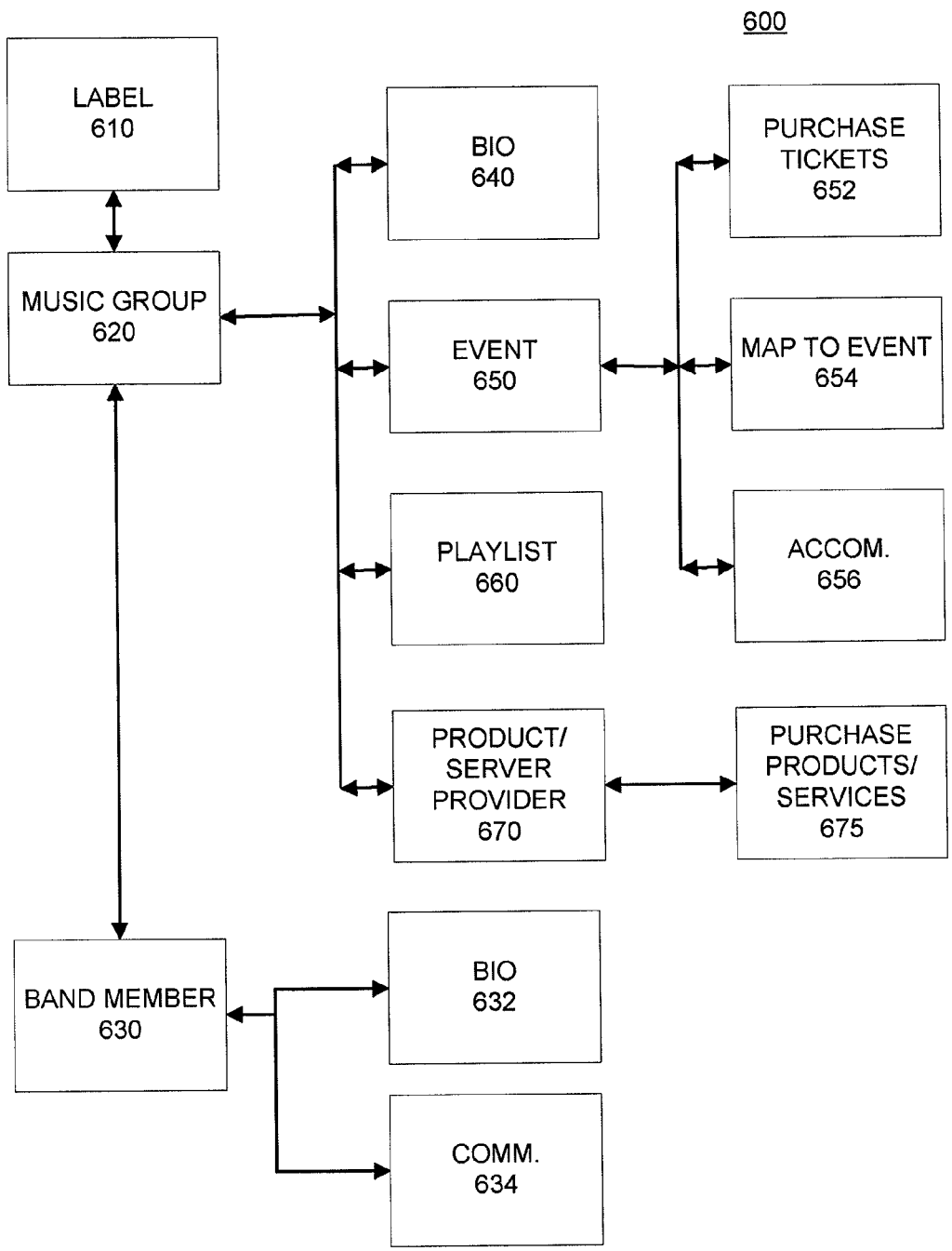
FIG. 6 shows an example of a music group flow diagram, according to an aspect of the invention.

FIG. 6 shows an example of a music group flow diagram 600 that may be implemented on the UID 110 and/or the server 150 (shown in FIG. 1), according to an aspect of the invention.

Referring to FIG. 6, one or more virtual trading cards associated with, for example, a particular music Label 610 may be retrieved. After opening or initializing a root Label 610 category (or classification), a particular music group 620 (e.g., rock band) may be selected from one or more music groups (not shown). Next, five subcategories associated with the music group 620 may be selectable, including band member 630, bio 640, events 650, playlist 660, or product/service provider 670.

The band member 630 may be selectable from one or more band members associated with the music group 620. After the band member 630 has been selected, one of two additional subcategories may be selectable, including bio 632 and communication 634. The bio 632 may include biography information associated with the band member 630. The communication 634 may include fields to receive entries (such as, e.g., notes, messages, photos, etc.) from the individual (via the UID 110) or to display messages (such as, e.g., notes, messages, photos, etc.) from the band member 630 to the individual on her/his UID 110.

The bio 640 may include biography information associated with the music group 620. The events 650 may include, for example, a list or menu with one or more selectable respective events associated with the music group 620, such as, for example, a concert, a rehearsal, an appearance, or the like. The playlist 660 may include, for example, a list or menu with one or more selectable multimedia associated with the music group 620, such as, for example, a music video, a song, an album, or the like. The product/service provider 670 may include, for example, a list or menu with one or more selectable links to respective entities that offer products or services related to the music group 620 (such as, e.g., memorabilia, etc.).

After selection of an event 650, an individual may select from three subcategories, including a purchase ticket 652, a map-to-event 654, or an accommodations 656. The purchase ticket 652 may include a list or menu with one or more selectable links to event tickets for the event 650. The map-to-event 654 may include a display of a map from, for example, the physical location of the UID 110 to the event 650, including directions. The accommodations 656 may include a list or menu with one or more selectable accommodations providers, which may be selected to, for example, make reservations at a hotel near the event 650.

After selecting a particular product/service provider 670, a list or menu with one or more selectable links to respective products/services 675 offered by the provider 670 may be displayed on the UID 110, which the individual may then select from, for example, to purchase a particular product or service.

Figure 7:
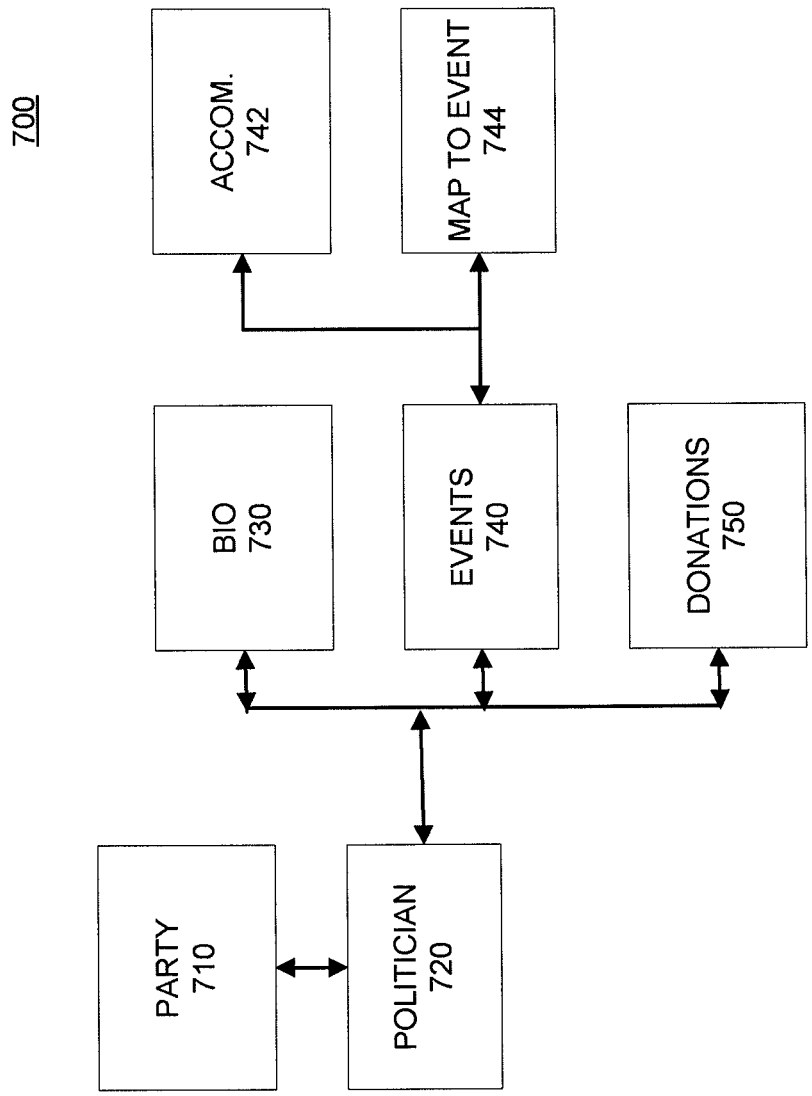
FIG. 7 shows an example of a political candidate flow diagram, according to an aspect of the invention.

FIG. 7 shows an example of a political candidate flow diagram 700 that may be implemented on the UID 110 and/or the server 150 (shown in FIG. 1), according to an aspect of the invention.

Referring to FIG. 7, one or more virtual trading cards associated with, for example, a particular political party 710 may be retrieved. After opening or initializing a root political party 710 category (or classification), a particular politician 720 may be selected from one or more politicians in the party 710 (not shown). Next, three subcategories associated with the politician 720 may be selectable, including bio 730, events 740, or donations 750. Should the events 740 be selected, two further subcategories may be selectable, including accommodations 742 or map-to-event 744.

The bio 730 may include biography information associated with the politician 720. The events 740 may include, for example, a list or menu with one or more selectable respective events associated with the politician 720, such as, for example, a speech, a dinner function, a charity, a meeting, an appearance, or the like. The donations 750 may include, for example, a list or menu with one or more selectable donations, such as, for example, a donation to the politician's campaign, a donation to politician's party, a donation to the politician's charity, or the like.

After the event 740 is selected, one of two further subcategories may be selectable, including accommodations 742 and map-to-event 744. The accommodations 742 may include a list or menu with one or more selectable accommodations providers, which may be selected to, for example, make reservations at a hotel near the event 740. The map-to-event 744 may include a display of a map from, for example, the physical location of the UID 110 to the particular event 740, including directions.

Figure 8:
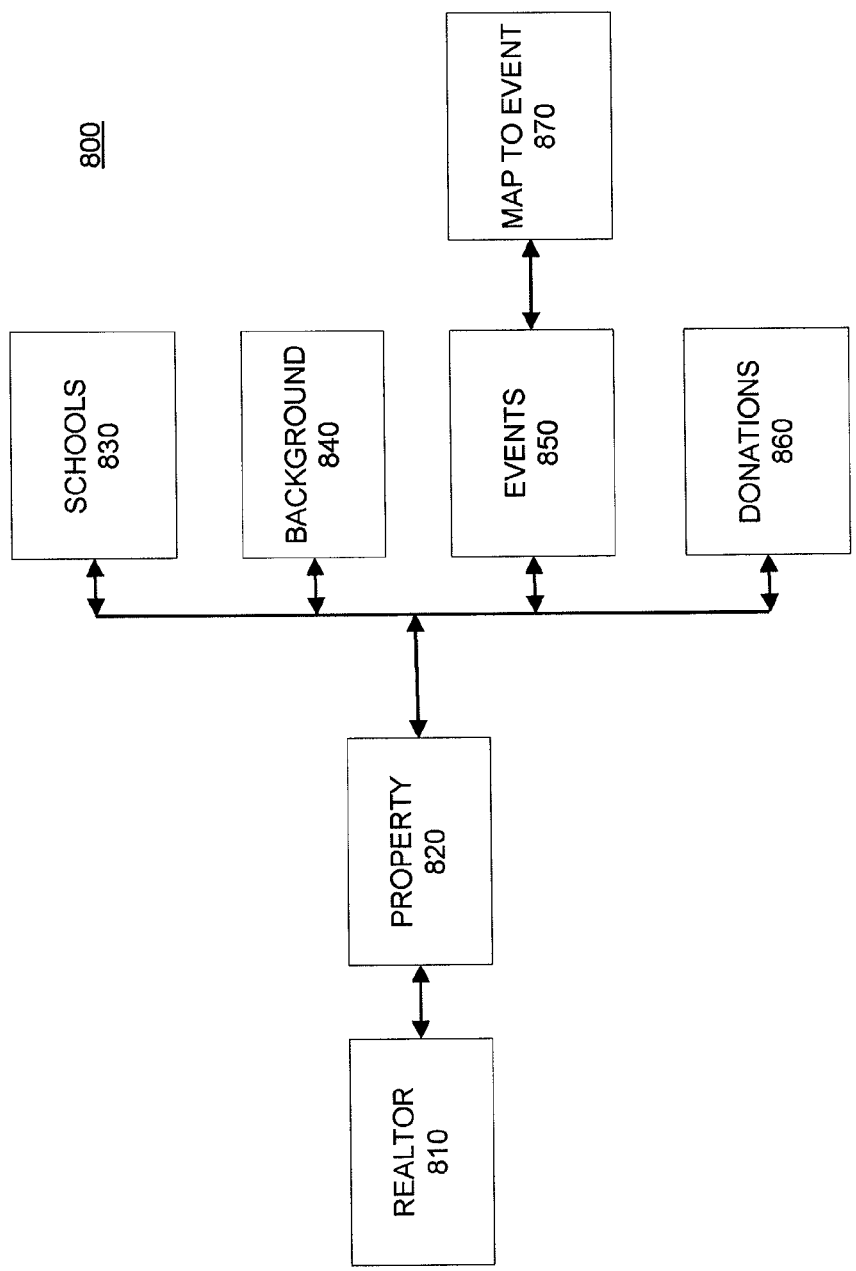
FIG. 8 shows an example of a real estate flow diagram, according to an aspect of the invention.

FIG. 8 shows an example of a real estate flow diagram 800 that may be implemented on the UID 110 and/or the server 150 (shown in FIG. 1), according to an aspect of the invention.

Referring to FIG. 8, one or more virtual trading cards associated with, for example, a particular realtor 810 may be retrieved. After opening or initializing a root realtor 810 category (or classification), a particular property 820 may be selected from one or more properties (not shown). Next, four subcategories associated with the property 820 may be selectable, including schools 830, background 840, events 850, or donations 860. Should the events 850 be selected, a map-to-event 870 may be selectable.

The schools 830 may include school-related information associated with the property 820, such as, for example, a school name, a school address, school performance reports, school demographics, school history, or the like. The background 840 may include information relating to the property 820 (such as, for example, past sales history, number of bedrooms, square footage, year built, garage, or the like), the neighborhood in which the property 820 is located (such as, for example, crime rates, housing prices, comparables, demographics of population, or the like), the neighborhood(s) surrounding the property 820 (such as, for example, crime rates, housing prices, comparables, demographics of population, or the like), or the like. The events 850 may include, for example, a list or menu with one or more selectable respective events associated with the property 820, such as, for example, an open house, a block party, or the like. The donations 860 subcategory may include, for example, a list or menu with one or more selectable donations, such as, for example, a donation to help repair or maintain the property 820 (such as, for example, where the property 820 is a historic site, a museum, a school, a religious site, or the like). The map-to-event 870 may include a display of a map of the area where the property 820 is situated and/or a map from, for example, the physical location of the UID 110 to the event 870 (which may be located at a different location from the property 820), including directions. Additionally, communications may be transmitted between the realtor 810 and the user through the system.

Figure 9:
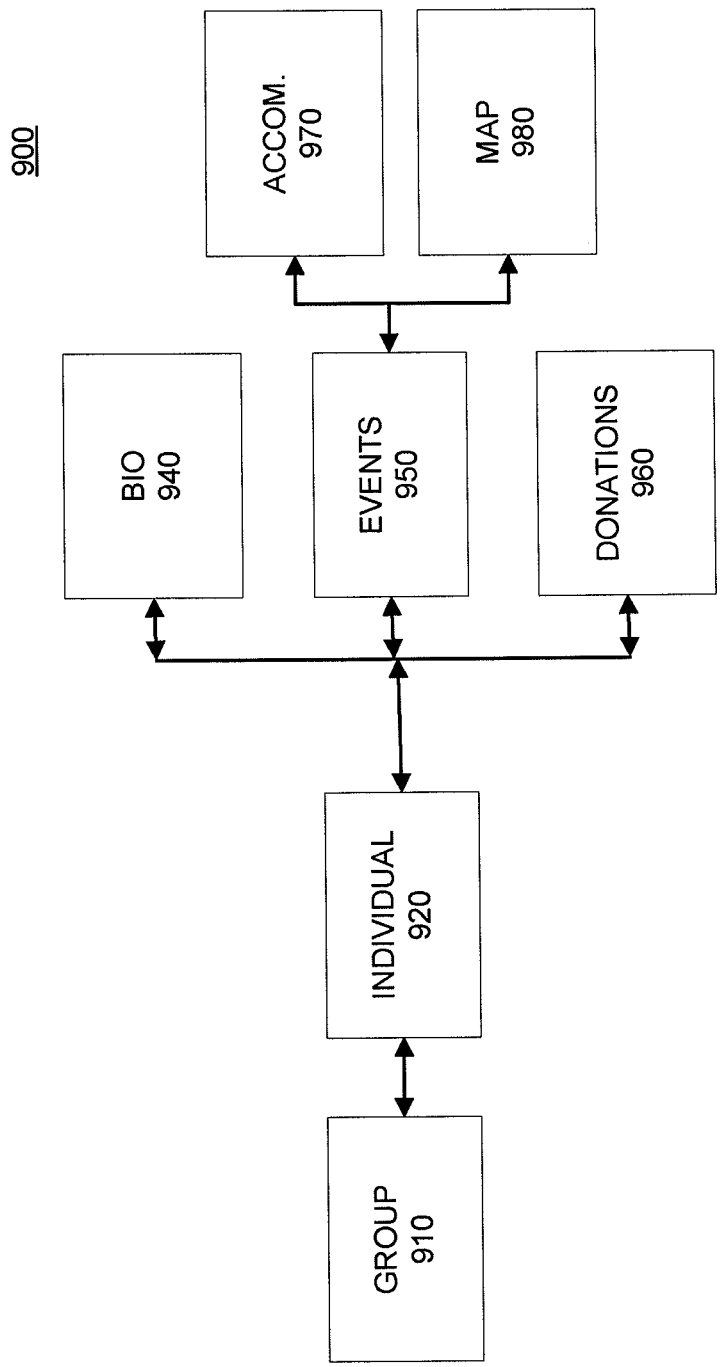
FIG. 9 shows an example of a non-profit or cause related flow diagram, according to an aspect of the invention.

FIG. 9 shows an example of a non-profit or cause related flow diagram 900 that may be implemented on the UID 110 and/or the server 150 (shown in FIG. 1), according to an aspect of the invention.

Referring to FIG. 9, one or more virtual trading cards associated with, for example, a non-profit or cause-related entity (group) 910 may be retrieved. After opening or initializing a root group 910 category (or classification), a particular individual 920 may be selected from one or more individuals associated with the group 910 (not shown). Next, three subcategories associated with the individual 920 may be selectable, including bio 940, events 950, or donations 960. Should the events 950 subcategory be selected, one of two additional subcategories may be selectable, including accommodations 970 or map-to-event 980.

The bio 940 may include biography information associated with the individual 920. The events 950 may include, for example, a list or menu with one or more selectable respective events associated with the individual 920, such as, for example, a speech, a dinner function, a charity, a meeting, an appearance, or the like. The donations 960 subcategory may include, for example, a list or menu with one or more selectable donations, such as, for example, a donation to the individual 920, a donation to the group 910, a donation to a charity associated with the individual 920 or group 910, or the like.

The accommodations 970 may include a list or menu with one or more selectable accommodations providers, which may be selected to, for example, make reservations at a hotel near the event 950. The map-to-event 980 may include a display of a map from, for example, the physical location of the UID 110 to the particular event 950, including directions.

Figure 10:
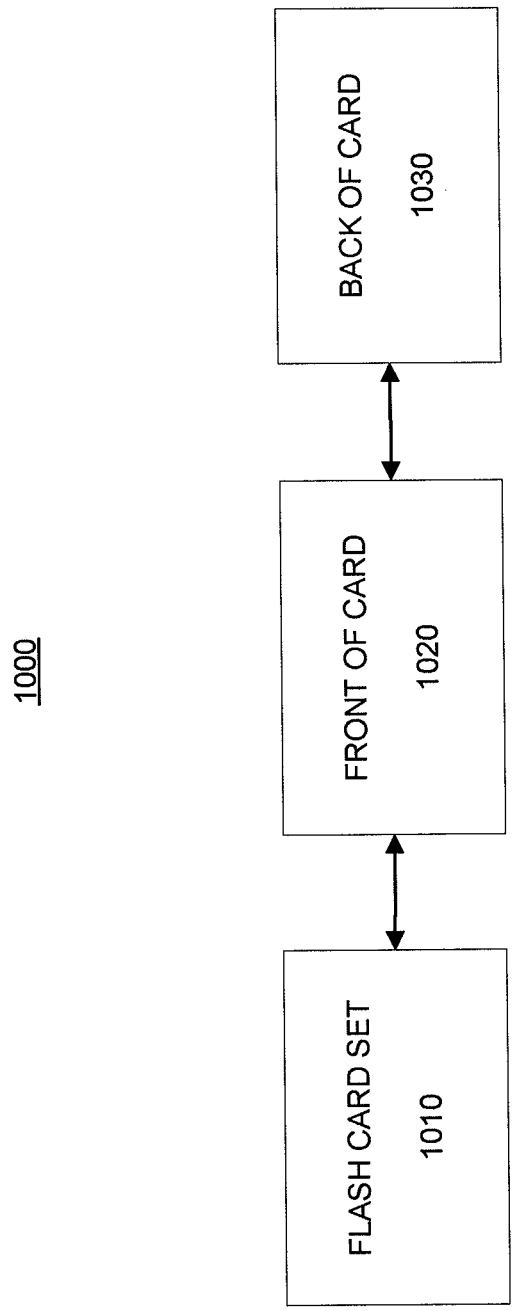
FIG. 10 shows an example of a flash card flow diagram, according to an aspect of the invention.

FIG. 10 shows an example of a flash card flow diagram 1000 that may be implemented on the UID 110 and/or the server 150 (shown in FIG. 1), according to an aspect of the invention.

Referring to FIG. 10, a flash card set 1010 containing one or more virtual trading cards may be initialized or selected. Subsequently, a particular flash card may be selected from the flash card set 1010, of which a virtual front view 1020 of the card may be displayed. A virtual back view 1030 of the card may then be selected.

In a non-limiting example of an embodiment of the invention, the virtual trading cards in FIG. 10 may include educational cards. In this regard, the virtual front view 1020 may include a question, a word, a mathematical term, a problem, or the like. The virtual back view 1030 may include an answer, a synonym, a translation, a antonym, an equation, a solution, or the like.

Figure 11:
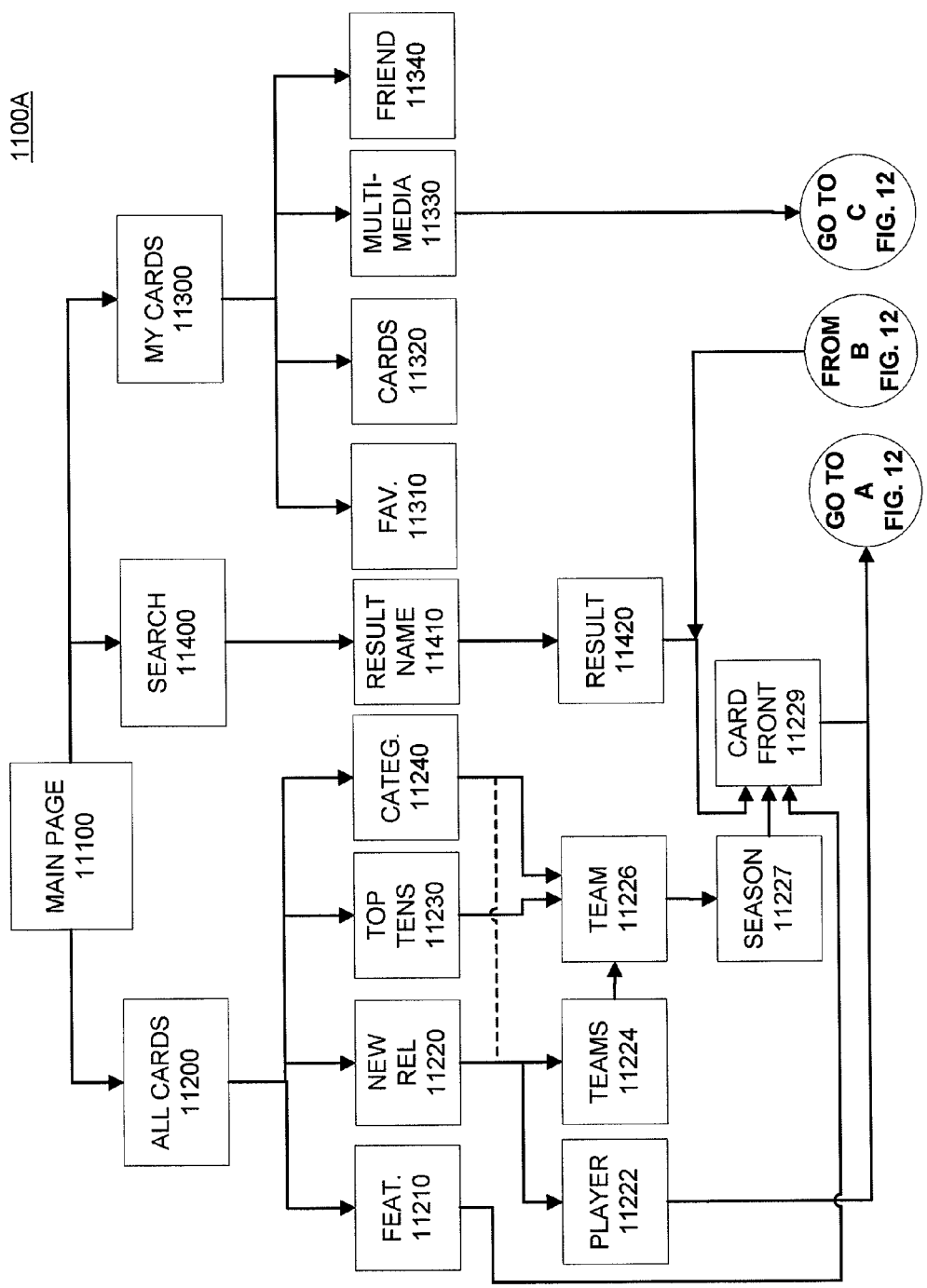
FIG. 11 shows a first portion of an example of a virtual trading card flow diagram, according to an aspect of the invention.

FIG. 11 shows a first portion 1100A of an example of a virtual trading card flow diagram 1100 that may be implemented on the UID 110 and/or the server 150 (shown in FIG. 1), according to an aspect of the invention. The following disclosure is provided with reference to a non-limiting exemplary application (i.e., sports virtual trading card) with an understanding that the invention is in no way limited to this application. Rather, the exemplary sport virtual trading card application is provided only to facilitate an understanding of the invention.

Referring to FIG. 11, a main (or root) page 11100 may be retrieved at initialization. The main page 11100 may include a plurality of links, including a selectable link to all cards 11200, a link to my cards 11300 and a link to search 11400. The link to all cards 11200 may link (e.g., through a hyperlink, or the like), for example, to one or more records or files in the database(s) 170, the server 150 or the data store 160. The link to my cards 11300 may link to one or more records or files in the UID 110, the database(s) 170, the server 150 or the data store 160. Similarly, the link to search 11400 may link to one or more records or files in the UID 110, the database(s) 170, the server 150 or the data store 160, thereby facilitating search and retrieval of desired virtual trading cards and/or associated information.

After selection of all cards 11200, one of four selectable subcategories associated with the all cards 11200 may be selected, including featured 11210, new releases 11220, top tens 11230 or categories 11240. The featured 11210 may include, for example, a list or menu with selectable links to respective one or more virtual trading cards 11229 featured by a particular card provider. The particular trading cards 11229, as well as the particular set(s) to which the cards may belong, may be customized by the card provider, or another entity (such as, e.g., the system administrator for the server 150, or the like).

The new releases 11220 may include, for example, a list or menu with one or more selectable links to respective virtual trading cards that were created within a predetermined time period (such as, e.g., cards created within the last two weeks, or the like). The trading cards included in (or associated with) the new releases 11220, as well as the particular set(s) to which the cards may belong, may be customized by the card provider, or some other entity (such as, e.g., the system administrator for the server 150, or the like). The new releases 11220 may include, for example, a list or menu with one or more selectable links to player 11222 or teams 11224.

The player 11222 may include, for example, a list or menu with one or more selectable links to players associated with the new release 11220. After selection of a particular player 11222, a virtual trading card may be retrieved for the particular player 11222 and a virtual front view of the card 11229 displayed on, e.g., the UID 110.

The top tens 11230 may include, for example, virtual trading cards that are associated with the top ten teams, players, games, events, or the like. From the top tens 11230, a team 11226 subcategory may be selectable. The top ten teams, for example, may be ranked by the card provider or another entity (such as, e.g., a professional sports league, or the like), as is known in the art.

The categories 11240 may include, for example, a list or menu with one or more selectable links to categories of sports, such as, for example, but not limited to, soccer, baseball, football, tennis, golf, hockey, swimming, diving, or the like. After selection of a particular category 11240, a particular team 11226 (or teams 11224, as shown by the broken line) associated with the selected category 11240 may be selectable.

The teams 11224 may include, for example, a list or menu with one or more selectable links to teams associated with the new release 11220. After selection of the teams 11224, a particular team 11226 may be selectable. The team 11226 may include, for example, a selectable link to one or more seasons (or games). After selection of the team 11226, a particular season 11227 may be selectable. The season 11227 may include, for example, a list or menu with one or more selectable virtual trading cars, from which a particular card may be selected and a virtual front view of the card 11229 retrieved and displayed on, e.g., the UID 110.

After selection of my cards 11300, one of four selectable subcategories associated with my cards 11300 may be selectable, including favorite 11310, individual cards 11320, multimedia 11330, or friends 11340. The favorite 11310 may include, for example, virtual trading cards previously designated as favorites. These cards may have been individually tagged by an individual using the UID 110, or the cards may have been tagged as favorites according to historical use data, such as, for example, the number of times a particular card has been viewed compared to other virtual trading cards associated with my cards 11300, a purchase price of the particular card compared to other virtual trading cards, or the like.

The multi-media 11330 may include, for example, a list or menu with one or more selectable sound files, video files, music files, sound bites, video excerpts, or the like, associated with the virtual trading cards in my cards 11300.

After selection of search 11400 and entry (or selection) of a search query, a result name 11410 may be selectable. The result name 11410 may include, for example, a selectable one or more team names, player names, game names, or the like. From the result name 11410, results 11420 may be selectable, from which a virtual trading card may be selected and a virtual front view of the card 11229 retrieved and displayed on, for example, the UID 110.

Figure 12:
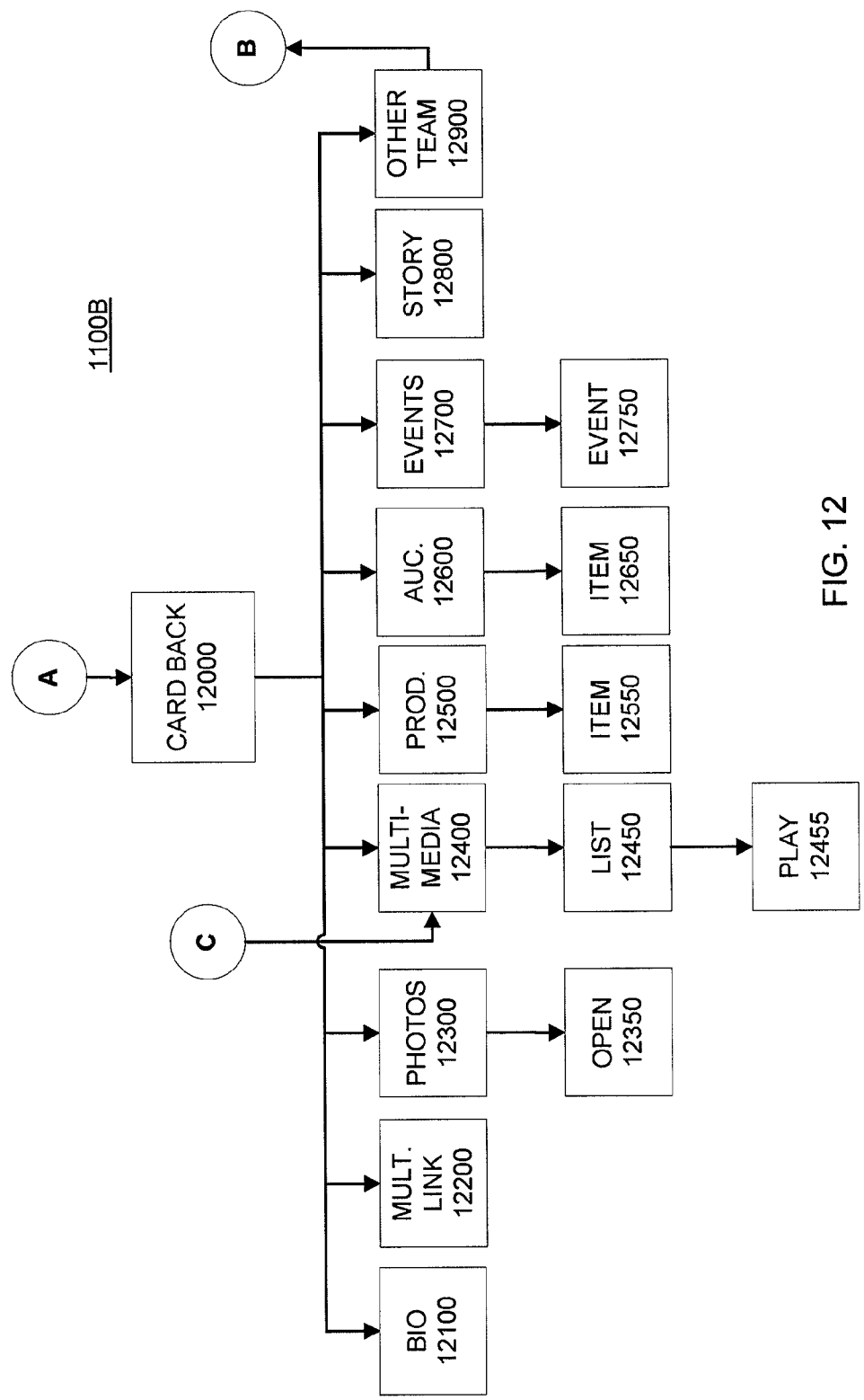
FIG. 12 shows a remaining portion of the virtual trading card flow diagram, according to an aspect of the invention.

FIG. 12 shows a remaining portion 1100B of the virtual trading card flow diagram 1100 that may be implemented on the UID 110 and/or the server 150 (shown in FIG. 1).

Referring to FIG. 12 (and FIG. 11), after the virtual card front 11229 is retrieved and displayed ("A"), a corresponding virtual card back 12000 may be selectable. After another team 12900 is selected ("B"), a virtual trading card may be selected from the team 12900 and a virtual front view of the card 11229 retrieved and displayed on, for example, the UID 110. And, after the multi-media 11330 is selected ("C"), one or more multi-media 12400 may be selectable. The virtual card back 12000 may include, for example, nine selectable subcategories, including bio 12100, multi-link 12200, photos 12300, multi-media 12400, products/services 12500, auction 12600, events 12700, story 12800 and other team 12900.

The bio 12100 may include, for example, biography information for the particular player associated with the virtual card back 12000. The multi-link 12200 may include, for example, statistics data for the particular player, a list or menu with one or more links to multi-media excerpts (such as, e.g., video highlights from game(s), sound bites, or the like), or the like. The multi-link 12200 may be customizable by, for example the virtual trading card provider. The photos 12300 may include, for example, one or more still images of the particular player (such as, e.g., professional photos, college photos, personal photos, or the like). The multi-media 12400 may include, for example, selectable categories of multimedia (such as, e.g., professional game videos, college game videos, speeches, event appearances, advertisements, autographs or the like). The products/services 12500 may include, for example, one or more selectable products or services that are associated with the particular player, including, for example, but not limited to, memorabilia. The auctions 12600 may include, for example, one or more selectable auctions associated with the particular player, including, for example, an auction of one or more products or services associated with the player, such as, for example, a personal item belonging to the player, a hired appearance by the player, or the like. The events 12700 may include, for example, a list or menu with one or more selectable games and/or events (including past, present, or future games/events) associated with the particular player. The story 12800 may include, for example, one or more fields in which an individual may enter a personal message, such as, for example (but not limited to) a story of how the particular player may have affected the individual. The other team 12900 may include, for example, a list or menu with one or more selectable teams, from which a particular virtual trading card may be selected and a virtual front view of the card 11229 retrieved and displayed on, for example, the UID 110.

After selection of a particular photo 12300, which may be customizable by, for example, the virtual trading card provider, a particular photo 12350 may be retrieved and displayed. The particular photo 12350 may include, for example, a selectable option to change the virtual front view 11229 of the trading card to the photo 12350, to buy photo 12350, or the like.

After selection of the multi-media 12400, a List 12450, which may include a list or menu with one or more selectable multi-media links, may be displayed. One or more of the multi-media links may be selected from the List 12450 to, for example, open and play a particular video 12455. The display may automatically revert back to the list 12450, after finishing playing the video.

After selection of the products 12500, a list or menu with one or more selectable links to products related to the particular player may be displayed (such as, e.g., a helmet, a jersey, a football, or other memorabilia). After selecting a particular product, the associated item 12550 may be displayed, including, for example, a description of the item, an option to "Buy Now," or the like.

After selection of the auction 12600, a list or menu with one or more selectable links to products related to the particular player that may be available on auction is displayed. After selecting a particular product on the list, the associated item 12650 may be displayed, including, for example, a description of the item, an option to "Buy Now," an option to bid, or the like.

After selection of the events 12700, a list or menu with one or more selectable links to events related to the particular player may be displayed. After selecting a particular event 12750 from the list, a description of the event, selectable links to multi-media, and the like may be displayed.

In exemplary flow diagrams 400 to 1100, shown in FIG. 4 to FIG. 12, the various categories and subcategories may be traversed on, for example, a UID 110 in either direction, as shown by the bi-directional arrows, or in a single direction as shown by unidirectional arrows, transitioning between the various categories or subcategories using special effects such as, for example, page-turning, wiping, fading, blending, mosaicing, or the like.

According to another aspect of the invention, a computer program is provided, embodied in a computer readable medium. The computer program includes instructions that, when executed on a general purpose computer, cause the computer to carry out the varies categories and/or subcategories described in FIGS. 4 to 12. The computer program includes a code section or segment for each of the categories and/or subcategories described herein.

It is noted that a public figure may include, for example, but is not limited to, an athlete (such as, e.g., a professional athlete, an amateur athlete, an Olympics athlete, or the like), an actor (such as, e.g., a television actor, a movie actor, a theatrical actor, or the like), a professional (such as, e.g. a medical doctor, a lawyer, an engineer, or the like), a product provider (such as, e.g., a manufacturer, a retailer, a wholesaler, a supplier, or the like), a service provider (such as, e.g., a teacher, a realtor, an electrician, a plumber, a carpenter, or the like), a business leader (such as, e.g., an executive, a board member, or the like), a politician, or the like.

It is noted that multi-media may include media and content that may use a combination of different content forms. The multi-media may include, for example, but is not limited to, text, audio, still images, animation, video, autographs or interactivity content forms, as is known in the art.

It is further noted that the categories and/or subcategories may be displayed as a window-within-a-window, edge-to-edge, as a round rectangle, or the like. It is noted that data available on one UID 110 may be synchronized with the data on another.

It is further noted that various selections between categories and/or subcategories of information discussed above with regard to FIG. 4 to FIG. 12 may include, for example, selecting one or more selectable links (such as, e.g., a thumbnail image, an alphanumeric links, or the like) on the display of the UID 110 (shown in FIG. 1). The selectable links may be selected by an individual by, for example, touching the screen of the UID 110 with a finger, a stylus, a pointing device, or the like, or by using a cursor, a key-command, or the like.

It is further noted that transitioning between displays of the various categories or subcategories shown in FIG. 4 to FIG. 12 may include special effects such as, for example, page-turning, wiping, fading, blending, mosaicing, or the like.

The invention provides a virtual trading card system, process and computer program that allows individuals to connect with public figures; allows individuals to connect with other individuals; or allows public figures to connect with other public figures. Further, the invention may provide individuals with a rich-media experience, including, for example, but not limited to, moving and/or still video images, biographic information (such as, e.g., past and/or present information about a player, or the like), statistics information (such as, e.g., game statistics, season statistics, career statistics, or the like), video highlights (such as, e.g., professional, collegiate, personal, or the like), still images (such as, e.g., NFL, NBL, photographer, personal, or the like), memorabilia (such as, e.g., authentic items, currently signed items, authorized copies of items, or the like), charity information (such as, e.g., a charity endorsed by a player, a charity the player may belong to, or the like), auction information (such as, e.g., a charity auction, an auction for a player's services, or the like), a story sharing message (such as, e.g., a place for individuals to communicate messages to other individuals or public figures, to receive messages from other individuals or public figures, or the like), events and appearances information (such as, e.g., events (past, present or future) where a player has, or will appear, locations (past, present or future) where a player has, or will appear, or the like), or the like.

In addition, the invention may include flash-cards and vocabulary-cards for teaching children to learn a new language, math, spelling, reading, or the like. For example, the virtual training card may include alphanumeric characters with corresponding sounds. The card may include a mathematical problem or question on the card front view (e.g., 200A in FIG. 2A) and an answer on the card back view (e.g., 200B in FIG. 2B).

According to an aspect of the invention, virtual trading cards may be created for nearly an industry, or individual, such as, but not limited to, for example, politicians, rock groups, leaders of business, individuals (such as, e.g., for birth announcements, children's birthday parties, teen's cards, etc.), fantasy games (e.g., cards could be traded from one owner to another), entertainers or entertainment, or the like.

The virtual trading cards may be made to fit a handheld device (e.g., UID 110, shown in FIG. 1) and to be displayed much like a traditional physical card. The virtual trading cards may be grouped together to create a cohesive offering and consistency, similar to a deck of trading cards.

The virtual trading cards may take on a social aspect, such as, for example, ratings or sharing with friends, and commenting on (such as, e.g., in the case of politician trading cards) to let a friend know the inside scoop for the subject of the trading card. The virtual trading cards may be linked to accommodations near a particular venue, maps, and/or merchandising. The cars may offer links to tie into merchandising such as, for example, products or services, or donations.

Individual trading cards may be found through a search, or drilling down to a particular card, through an associated group, or the like.

The virtual trading cards may be electronically traded, used for a fantasy game (e.g., fantasy football), or shared with friends.

While the invention has been described in terms of exemplary embodiments, those skilled in the art will recognize that the invention can be practiced with modifications in the spirit and scope of the appended claims. These examples are merely illustrative and are not meant to be an exhaustive list of all possible designs, embodiments, applications or modifications of the invention.

What is claimed:

1. A virtual trading card system, comprising:
   a data source that provides information of a public figure; and
   software running on a user device configured to present on a display of the user device first and second views of a virtual card to a viewer as a first party, wherein the virtual card is customized by a provider of the virtual card as a second party, wherein the virtual card portrays the public figure and presents information of the public figure;
   wherein the portrayal includes digital media in which the public figure can be seen or heard or both, and a signature field for obtaining a signature directly from the public figure and displaying the signature;
   wherein at least a portion of the information is presented in a plurality of updateable data fields, at least one of which receives data entered into the user device via a user input, and at least another one of which receives data directly from a third party data source communicatively coupled to the user device, in accordance with a user profile; and
   wherein the user device presents with the virtual card at least one selectable link to a portion of a site from which a product or service pertaining to the public figure, or both, can be purchased.

2. The system according to claim 1, wherein the portrayal comprises visual or aural or multi-media content of the public figure.

3. The system according to claim 2, wherein the content comprises one of a professional still image; a college still image; and a personal still image.

4. The system according to claim 1, wherein the third party data source is one of:
   an Olympics data source;
   a sports team data source;
   a music group data source;
   a political data source;
   an individual data source; and
   a real estate data source.

5. The system according to claim 1, wherein the software running on the user device is configured to trade the virtual card with another user device.

6. The system according to claim 1, wherein the virtual card is grouped together with other virtual cards to create a cohesive offering and consistency.

7. The system according to claim 1, wherein the user device is a handheld portable personal telecommunication device.

8. A virtual trading card method, comprising:
   presenting on a display of a user device to a viewer as a first party, a main page that includes one or more main page selectable links; and
   presenting, after a selection of one of the main page links, a subcategory page that includes one or more selectable subcategory links, wherein the subcategories include at least one of an all cards subcategory, a search subcategory, and a my cards subcategory;
   presenting, after a selection of one of the subcategory links, a virtual card pertaining to a public figure and customized by a provider of the virtual card as a second party;
   wherein the presenting the virtual card comprises presenting first and second views of the virtual card, wherein one of the views includes visual or multimedia content that is an excerpt from a video that includes an appearance of the public figure and a signature field for obtaining a signature directly from the public figure, and displaying the signature, and wherein the other of the views includes at least one updateable data field that presents information entered into the user device via a user input, and at least one updateable data field that presents information obtained directly from a third party data source communicatively coupled to the user device in accordance with a user profile; and
   presenting with the virtual card, at least one selectable link to a portion of a site from which a product or service pertaining to the public figure, or both, can be purchased.

9. The method according to claim 8, wherein the my virtual trading cards subcategory is selected, further comprising:
   displaying a menu comprising a selectable one or more of a favorites subcategory, a cards subcategory, a multimedia subcategory, and a friend subcategory.

10. The method according to claim 8, wherein the search subcategory is selected, further comprising:
    executing a search query.

11. The method according to claim 8, wherein the all virtual trading cards subcategory is selected, further comprising:
    displaying a menu comprising a selectable one or more of a featured subcategory, a new release subcategory, a top tens subcategory, and a category subcategory.

12. The method according to claim 11, wherein the featured subcategory is selected, further comprising:
    displaying a selectable link to a different view of the virtual trading card.

13. The method according to claim 11, wherein the new release subcategory is selected, further comprising:
    displaying a menu comprising one or more selectable links to a public figure; or
    presenting a menu comprising one or more selectable links to a team.

14. The method according to claim 11, wherein the top tens subcategory is selected, further comprising:
    displaying a menu comprising one or more selectable links to a team.

15. The method according to claim 14, further comprising:
    displaying a menu comprising one or more selectable links to a season for a selected team.

16. The method according to claim 15, further comprising:
displaying a front view of a virtual card pertaining to a selected season and team.

17. The method according to claim 16, further comprising:
displaying a back view of the virtual card.

18. The method according to claim 17, further comprising displaying a menu comprising one or more selectable links to a subcategory comprising at least one of:
a bio subcategory;
a multi-link subcategory;
a photos subcategory;
a multi-media subcategory;
a products subcategory;
an auction subcategory;
an events subcategory;
a story subcategory; and
an other team subcategory.

19. The method according to claim 18, further comprising displaying a menu comprising one or more selectable links to a subcategory comprising at least one of:
a donations subcategory;
a map-to-event subcategory;
an accommodations subcategory;
a purchase ticket subcategory;
a communications subcategory;
a music group subcategory;
a public figure subcategory;
a playlist subcategory; and
an events subcategory.

20. The method according to claim 18, wherein the photos subcategory is displayed, further comprising:
displaying a selectable open subcategory.

21. The method according to claim 18, wherein the multi-media subcategory is displayed, further comprising:
displaying a selectable list subcategory.

22. The method according to claim 18, wherein the product subcategory is displayed, further comprising:
displaying a selectable item subcategory.

23. The method according to claim 18, wherein the auction subcategory is displayed, further comprising:
displaying a selectable item subcategory.

24. The method according to claim 18, wherein the events subcategory is displayed, further comprising:
displaying a selectable event subcategory.

\* \* \* \* \*